(12) United States Patent
Jacoby et al.

(10) Patent No.: US 9,396,200 B2
(45) Date of Patent: Jul. 19, 2016

(54) AUTO-SNAPSHOT MANAGER ANALYSIS TOOL

(71) Applicant: Dell Products, LP, Round Rock, TX (US)

(72) Inventors: Robert B. Jacoby, Merrimack, NH (US); Jill Leslie Manfield, Merrimack, NH (US)

(73) Assignee: Dell Products, LP, Round Rock, TX (US)

( * ) Notice: Subject to any disclaimer, the term of this patent is extended or adjusted under 35 U.S.C. 154(b) by 122 days.

(21) Appl. No.: 14/180,742

(22) Filed: Feb. 14, 2014

(65) Prior Publication Data

US 2015/0074055 A1  Mar. 12, 2015

Related U.S. Application Data

(63) Continuation-in-part of application No. 14/087,745, filed on Nov. 22, 2013, which is a continuation-in-part of application No. 14/065,825, filed on Oct. 29, 2013, now Pat. No. 9,317,349, which is a continuation-in-part of application No. 14/024,454, filed on Sep. 11, 2013.

(51) Int. Cl.
  *G06F 11/00* (2006.01)
  *G06F 17/30* (2006.01)
  *G06F 11/07* (2006.01)
  *G06F 11/14* (2006.01)

(52) U.S. Cl.
  CPC ........ *G06F 17/30088* (2013.01); *G06F 11/079* (2013.01); *G06F 11/0778* (2013.01); *G06F 11/14* (2013.01)

(58) Field of Classification Search
  USPC .......................................................... 714/37
  See application file for complete search history.

(56) References Cited

U.S. PATENT DOCUMENTS

| | | | |
|---|---|---|---|
| 5,084,819 A | 1/1992 | Dewey et al. | |
| 5,828,583 A | 10/1998 | Bush et al. | |
| 5,917,724 A | 6/1999 | Brousseau et al. | |
| 6,189,084 B1 | 2/2001 | Kurisu | |

(Continued)

OTHER PUBLICATIONS

Pinheiro, E., et al., "Failure Trends in a Large Disk Drive Population," *Proceedings of the 5th USENIX Conference on File and Storage Technologies (FAST'07)*, (Feb. 2007).

(Continued)

*Primary Examiner* — Amine Riad
(74) *Attorney, Agent, or Firm* — Hamilton, Brook, Smith & Reynolds, P.C.

(57) ABSTRACT

The invention pertains to a method and information handling system (IHS) for analyzing snapshot operation data of one or more snapshot operations associated with at least one storage device and at least one host computer. An embodiment of a method of the present invention begins by locating the snapshot operation data. Next, configuration information is assembled from the snapshot operation data. Further, debug data associated with the one or more snapshot operations is stored. An analysis is performed including the snapshot operation data, the configuration information, and the stored debug data. Next, the method identifies one or more issues and one or more action plans for resolution based upon the analysis. Finally, the method provides a report to one or more users including the configuration information, the one or more identified issues, and the one or more action plans.

20 Claims, 9 Drawing Sheets

(56) References Cited

U.S. PATENT DOCUMENTS

| | | | |
|---|---|---|---|
| 6,408,406 B1 | 6/2002 | Parris | |
| 6,415,189 B1 | 7/2002 | Hajji | |
| 6,467,054 B1 | 10/2002 | Lenny | |
| 6,771,440 B2 | 8/2004 | Smith | |
| 6,845,306 B2 | 1/2005 | Henry et al. | |
| 7,236,911 B1 | 6/2007 | Gough et al. | |
| 7,278,057 B2 * | 10/2007 | Betancourt | G06F 9/524 714/38.11 |
| 7,302,617 B2 | 11/2007 | Wookey | |
| 7,373,559 B2 | 5/2008 | Guha | |
| 7,409,582 B2 | 8/2008 | McNeill, Jr. et al. | |
| 7,434,097 B2 | 10/2008 | Guha et al. | |
| 7,490,073 B1 * | 2/2009 | Qureshi | G06N 5/048 706/50 |
| 7,539,907 B1 | 5/2009 | Johnsen et al. | |
| 7,603,395 B1 * | 10/2009 | Bingham | G06F 11/1471 |
| 7,653,563 B2 | 1/2010 | Veeningen et al. | |
| 7,676,445 B2 | 3/2010 | Fry et al. | |
| 7,765,190 B1 * | 7/2010 | Bingham | G06F 11/1458 707/649 |
| 7,865,278 B2 | 1/2011 | Underdal et al. | |
| 7,877,645 B2 | 1/2011 | Meyer et al. | |
| 7,908,526 B2 | 3/2011 | Guha | |
| 8,086,893 B1 | 12/2011 | MacFarland et al. | |
| 8,103,463 B2 | 1/2012 | Kalgren et al. | |
| 8,185,784 B2 | 5/2012 | McCombs et al. | |
| 8,315,991 B2 * | 11/2012 | Mandagere | G06F 11/1435 707/685 |
| 8,316,263 B1 | 11/2012 | Gough et al. | |
| 8,386,889 B1 | 2/2013 | Tang et al. | |
| 8,521,546 B2 | 8/2013 | Brown | |
| 8,760,780 B1 | 6/2014 | Brooker | |
| 8,782,491 B2 | 7/2014 | Resch et al. | |
| 8,812,342 B2 | 8/2014 | Barcelo et al. | |
| 8,856,927 B1 * | 10/2014 | Beloussov | G06F 21/53 726/23 |
| 8,862,948 B1 | 10/2014 | Lam | |
| 8,880,801 B1 | 11/2014 | Robins et al. | |
| 8,904,144 B1 | 12/2014 | Chelur | |
| 8,909,990 B2 * | 12/2014 | Davis | G06F 11/3636 714/37 |
| 8,949,672 B1 | 2/2015 | Srihamat et al. | |
| 8,949,863 B1 | 2/2015 | Coatney et al. | |
| 8,972,799 B1 | 3/2015 | Brooker et al. | |
| 9,037,921 B1 | 5/2015 | Brooker et al. | |
| 9,084,937 B2 | 7/2015 | Gadher et al. | |
| 9,189,309 B1 | 11/2015 | Ma et al. | |
| 9,317,349 B2 | 4/2016 | Jacoby et al. | |
| 2002/0087950 A1 * | 7/2002 | Brodeur | G06F 11/3636 717/124 |
| 2003/0112538 A1 | 6/2003 | Smith | |
| 2003/0204788 A1 | 10/2003 | Smith | |
| 2004/0205403 A1 | 10/2004 | Markow et al. | |
| 2004/0260967 A1 | 12/2004 | Guha et al. | |
| 2005/0265160 A1 | 12/2005 | Sasaki et al. | |
| 2006/0047715 A1 * | 3/2006 | Parizeau | G06F 17/30353 |
| 2006/0053338 A1 | 3/2006 | Cousins et al. | |
| 2006/0075189 A1 | 4/2006 | Hood et al. | |
| 2006/0090098 A1 | 4/2006 | Le et al. | |
| 2006/0112135 A1 | 5/2006 | Warshawsky | |
| 2007/0136389 A1 * | 6/2007 | Bergant | G06F 11/1435 |
| 2007/0272751 A1 | 11/2007 | Tsurumi | |
| 2008/0209274 A1 | 8/2008 | Nicholson et al. | |
| 2009/0161243 A1 | 6/2009 | Sharma et al. | |
| 2009/0204852 A1 | 8/2009 | Diggs et al. | |
| 2009/0279673 A1 | 11/2009 | Maffre et al. | |
| 2010/0030586 A1 | 2/2010 | Taylor et al. | |
| 2010/0050023 A1 | 2/2010 | Scarpelli et al. | |
| 2010/0324945 A1 | 12/2010 | Hessing | |
| 2011/0106763 A1 * | 5/2011 | Madan | G06F 11/2094 707/639 |
| 2011/0276836 A1 | 11/2011 | Kahana et al. | |
| 2012/0136985 A1 * | 5/2012 | Popescu | G06Q 50/01 709/224 |
| 2013/0091499 A1 * | 4/2013 | Soundararajan | G06F 9/45558 718/1 |
| 2014/0019194 A1 | 1/2014 | Anne | |
| 2014/0040897 A1 * | 2/2014 | Davis | G06F 11/3636 718/100 |
| 2014/0108855 A1 | 4/2014 | Gopakumar et al. | |
| 2014/0244343 A1 | 8/2014 | Wilson et al. | |
| 2014/0278730 A1 | 9/2014 | Muhart et al. | |
| 2014/0358357 A1 * | 12/2014 | Jones | G07C 5/0816 701/31.4 |
| 2015/0046756 A1 | 2/2015 | Sreekumaran et al. | |
| 2015/0052406 A1 * | 2/2015 | Garrett | G06F 11/1448 714/45 |
| 2015/0067153 A1 | 3/2015 | Bhattacharyya et al. | |
| 2015/0074452 A1 | 3/2015 | Tsukahara et al. | |
| 2015/0074462 A1 | 3/2015 | Jacoby | |
| 2015/0074463 A1 | 3/2015 | Jacoby et al. | |
| 2015/0074467 A1 | 3/2015 | Jacoby | |
| 2015/0074468 A1 | 3/2015 | Jacoby et al. | |
| 2015/0135033 A1 | 5/2015 | Ellis et al. | |
| 2016/0039291 A1 | 2/2016 | Reese et al. | |

OTHER PUBLICATIONS

Anderson, D., et al., "More than an interface—SCSI vs. ATA," *Proceedings of the 2nd Annual Conference on File and Storage Technology (FAST '03)*, pp. 1-13 (Mar. 2003).

Cole, G., "Estimating Drive Reliability in Desktop Computers and Consumer Electronics Systems," *Seagate Technology Paper TP-338. 1*, pp. 1-8, (Nov. 2000).

Yang, J., et al., "A Comprehensive Review of Hard-Disk Drive Reliability," *Proceedings of the Annual Symposium on Reliability and Maintainability*, pp. 403-409 (Jan. 1999).

Hughes, G.F., et al., "Improved Disk-Drive Failure Warnings," *IEEE Transactions on Reliability*, 51(3): 350-357 (Sep. 2002).

Murray, J.F., et al., "Machine Learning Methods for Predicting Failures in Hard Drives: A Multiple-Instance Application," *J. Machine Learning Research*, 6: 783-816 (May 2005).

Wilcoxon, F., "Individual Comparison by Ranking Methods," *Biometrics Bulletin*, 1(6): 80-83 (1945): http://www.jstor.org, pp. 80-83 (Dec. 18, 2006).

* cited by examiner

ASM detected in: logs-2012-08-11-AB.CD.EF/
Group name:      groupAprod
Hostname:        hostAvsm
Management IP:   192.123.456.XX
Appliance version: 3.X.Y.123
VASA version:    1.X.Y.123
PS Groups:       1

Routing table
Destination    Gateway        Genmask         Flags  MSS  Window  irtt  Iface
192.XXX.YYY.0  0.0.0.0        255.255.255.0   U      0    0       0     eth0
0.0.0.0        192.XXX.YYY.1  0.0.0.0         UG     0    0       0     eth0

520a

Error detected accessing group from VSM

521a

- The customer either didn't add the group yet to VSM, or
- they added it but haven't rebooted the VSM appliance to take effect, or
- they can't access the group using the route provided, in which case they'll need to check their netstat output to confirm the route to the subnet 522a

520b:
```
ASM detected in:    LOG/
Server Name:        ServerNameA
Operating System:   Microsoft Windows Server 2008 Standard Service Pack X Build Y
Model:              PowerEdge M6XX
Processor:          Intel(R) Xeon(R) CPU X5550 @ 2.XXGHz, 2XXX Mhz, N Core(s),
M Logical Processor(s)
MPIO version:       22XXX
HIT Update history: Update from version A.1.2 to B.1.2 started: 08:11:37 8-2-2011
```

521b:
```
vss-control module is inaccessible

Interesting error messages to be reviewed:
14Sep13:22:36:58 Source: Application Error   Type: Error   Faulting
application vssvc.exe, version 6.0.XXXX.YYYYY, time stamp 0x49123456,
faulting module vssvc.exe, version 6.0.XXXX.ZZZZZ, time stamp 0x49e02c5c,
exception code 0xabcd1234, fault offset 0x00000000000012345,
.
.
17Sep13:06:15:07 Source: Application Error   Type: Error   Faulting
application eqlreqservice.exe, version 4.A.B.1234, time stamp 0x520bXXXX,
faulting module msxml3.dll, version 8.100.5006.0, time stamp 0x5093XXXX,
exception code 0xabcd1234, fault offset 0x00000000000234567,
```

522b:
```
Warning! Vendor A driver version 1.2.3 detected, review vendor A
best practices document
```

Analysis:
  Reporting functions include:
    Group name
    Hostname
    Management IP Address
    Appliance version
    VASA version
    Number of PS Groups
    Routing table data 520c Issues detected:
  Check for missing groups
  Check for conflicts on volumes being replicated while their datastore is also being replicated - reference KCS 541811 for more info
  Check for replication issues while communicating with peer - reference KCS 609141 for more info
  Check for Group Connectivity and credentials - reference VSM release notes, page 12
  Check for VCENTER connectivity issues, in which the VCENTER server is on a virtual machine while using replication or snapshots
  Check for deleted VSM peer in which broken replicas remain - reference KCS 609141 for more info
  Check for appliance being deployed but having no group detected at the time the diagnostics were run.
  Check for errors accessing Group from VSM
  Check for unsaved changes pending restart of appliance
  Check for VASA registration failures 521c

FIG. 6A

520d —
Analysis:
Reporting functions include:
 Server Name
 Operating System and patch level
 Model of server
 Processor
 MPIO version
 HIT update history (if existing)

521d —
Issues detected:
 Check to confirm the vss-control volume is accessible from this host -- reference KCS number 630363 for more info.
 Check for when the vss-control volume is accessible from this host, but the host has incorrect credentials - reference KCS 630363 for more info.
 Check for cluster nodes that haven't been properly added to the HIT group - reference Auto-Snapshot manager Guide HIT Group page 2 and page 43
 Check for broken or inaccessible snapshots - reference Auto-Snapshot manager Guide Broken Copies troubleshooting page 67
 Check for PR reservations for volumes that are no longer found
 Check for install issues due to using 'MSI' installer instead of setup.exe
 Check for faulty NIC driver - reference tech support's 'NIC Best practices' guide
 Check for related Application Errors
 Check for related Application Hangs
 Check for related Application Crashes
 Check for BUG 12345 in which the customer is unable to create Hyper-V VM snapshot from ASM/ME when the VM is using storage direct
 Check for missing internal PUBLIC SNMP string - reference KCS 630363 for more info.
 Check for failed cluster volume with no registrants
 Check for missing CHAP username - reference KCS 630363 for more info.
 Check to confirm 'vssadmin list shadows' runs without error - reference KCS 630364 for more info

AUTO-SNAPSHOT MANAGER ANALYSIS TOOL

RELATED APPLICATIONS

This application is a continuation-in-part of U.S. application Ser. No. 14/087,745 filed on Nov. 22, 2013, which is a continuation-in part of U.S. application Ser. No. 14/065,825 filed on Oct. 29, 2013, which is a continuation-in part of U.S. application Ser. No. 14/024,454 filed on Sep. 11, 2013. The entire teachings of the above applications are incorporated herein by reference.

BACKGROUND OF THE INVENTION

The increased use of technology and computers has generated a corresponding increase in digital data. This ever-increasing digital data requires a corresponding ever-increasing amount of storage space.

The need for storage space for digital data has been fueled through many changes in society. For example, home computer users increased storage of multimedia data, especially video and photographic data, has served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

With this increase of digital data, there has been a corresponding further need to back up the digital data. One approach to backing up digital data uses locking mechanisms. However, using locking mechanisms, the time that a system is down is generally intolerable for systems that have large amounts of digital data. Therefore, more efficient backup mechanisms, known as snapshots, are commonly performed. Snapshots allow for quick and efficient capture of digital data. However, there is presently no comprehensive approach for troubleshooting snapshots when they do not work as expected.

SUMMARY OF THE INVENTION

Thus, an efficient and reliable method for analyzing snapshot operation data of one or more snapshot operations is presented. The one or more snapshot operations may be associated with at least one storage device and at least one host computer. An embodiment of a method of the present invention begins by locating the snapshot operation data associated with the one or more snapshot operations associated with the at least one storage device and the at least one host computer. Next, configuration information is assembled from the snapshot operation data. Further, debug data associated with the one or more snapshot operations is stored. Next, an analysis is performed including the snapshot operation data, the configuration information, and the stored debug data. Next, the method identifies one or more issues and one or more action plans for resolution based upon the analysis. Finally, the method provides a report to one or more users including the configuration information, the one or more identified issues, and the one or more action plans.

In an embodiment of the method of the present invention, the method determines a vendor type of a vendor that provided the one or more snapshot operations, and performs the analysis including the snapshot operation data based upon the vendor type. In another embodiment of the method of the present invention, the snapshot operation data includes one or more log files with one or more hardware, software, or configuration characteristics of the one or more snapshot operations. In yet another embodiment, the one or more issues include one or more issues at the at least one host computer, one or more issues at the at least one storage device, or one or more issues at an interface between the host computer and the storage device. In another embodiment of the method of the present invention, the one or more issues include one or more hardware, configuration, or software issues. In a further embodiment, the one or more issues include one or more potential issues.

In yet another embodiment of the method of the present invention, the configuration information includes at least one hardware characteristic, software characteristic, environmental characteristic, configuration characteristic, or network characteristic. The one or more identified issues may include an issue with at least one of: a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic. The one or more action plans may include an action plan to correct or update at least one of: a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

In yet another embodiment of the method of the present invention, the snapshot data may be analyzed from two or more snapshot operations. The method may include locating the snapshot operation data associated with the two or more snapshot operations associated with the at least one storage device and the at least one host computer. The method may also include assembling configuration information from the snapshot operation data and storing debug data associated with the two or more snapshot operations. The method may further include performing an analysis including the snapshot operation data, the configuration information, and the stored debug data. The method may further include identifying one or more issues and one or more action plans for resolution based upon the analysis. Finally, the method may include providing a report to one or more users including the configuration information, the one or more identified issues, and the one or more action plans.

Another embodiment of the method of the present invention may include analyzing snapshot operation data of one or more snapshot operations, the snapshot operation data including one or more log files, the one or more snapshot operations associated with at least one storage device and at least one host computer. The method may include locating the snapshot operation data including one or more log files associated with the one or more snapshot operations associated with the at least one storage device and the at least one host computer. The method may include determining a vendor type of a vendor that provided the one or more snapshot operations. The method may include assembling configuration information from the snapshot operation data. The method may include storing debug data associated with the one or more snapshot operations. The method may also include performing an analysis including the snapshot operation data, the configuration information, the vendor type, and the stored debug data. Next, the method may include identifying one or more issues and one or more action plans for resolution based upon the analysis. In addition, the method may include providing a report to one or more users including the configuration information, the one or more identified issues, and the one or more action plans.

A further embodiment of the present invention is directed to an Information Handling System (IHS). An embodiment of the IHS comprises a data module configured to locate the snapshot operation data associated with the one or more snapshot operations associated with the at least one storage device and the at least one host computer. The data module may be further configured to assemble configuration information from the snapshot operation data. The data module may be further configured to store debug data associated with the one or more snapshot operations. The IHS may further comprise a computing module configured to perform an analysis including the snapshot operation data, the configuration information, and the stored debug data. The computing module may be further configured to identify one or more issues and one or more action plans for resolution based upon the analysis. The IHS may further comprise a display module configured to provide a report to one or more users including the configuration information, the one or more identified issues, and the one or more action plans.

According to an embodiment of the IHS, the computing module may be further configured to determine a vendor type of a vendor that provided the one or more snapshot operations, and the computing module may be further configured to perform the analysis including the snapshot operation data based upon the vendor type.

In another embodiment of the IHS, the snapshot operation data may include one or more log files with one or more hardware, software, or configuration characteristics of the one or more snapshot operations. The one or more issues may include one or more issues at the at least one host computer, one or more issues at the at least one storage device, or one or more issues at an interface between the host computer and the storage device. The one or more issues may include one or more hardware, configuration, or software issues. The one or more issues may include one or more potential issues.

In yet another embodiment of the IHS, the configuration information may include at least one hardware characteristic, software characteristic, environmental characteristic, configuration characteristic, or network characteristic. The one or more identified issues may include an issue with at least one of: a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristics. The one or more action plans may include an action plan to correct or update at least one of: a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

In another embodiment of the IHS, the IHS may analyze the snapshot operation data from two or more snapshot operations. The IHS may include a data module configured to locate the snapshot operation data associated with the two or more snapshot operations associated with the at least one storage device and the at least one host computer. The data module may be further configured to assemble configuration information from the snapshot operation data. The data module may be further configured to store debug data associated with the two or more snapshot operations. The IHS may include a computing module configured to perform an analysis including the snapshot operation data, the configuration information, and the stored debug data. The computing module may be further configured to identify one or more issues and one or more action plans for resolution based upon the analysis. The IHS may include a reporting module configured to provide a report to one or more users including the configuration information, the one or more identified issues, and the one or more action plans.

An alternative embodiment of the present invention is directed to a non-transitory computer readable medium having stored thereon a sequence of instructions which, when loaded and executed by a processor coupled to an apparatus, causes the apparatus to: locate snapshot operation data associated with one or more snapshot operations associated with at least one storage device and at least one host computer, assemble configuration information from the snapshot operation data, store debug data associated with the one or more snapshot operations, perform an analysis including the snapshot operation data, the configuration information, and the stored debug data, identify one or more issues and one or more action plans for resolution based upon the analysis, and provide a report to one or more users including the configuration information, the one or more identified issues, and the one or more action plans.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5A depicts one embodiment of a report provided to a user.

FIG. 5B depicts another embodiment of a report provided to a user.

FIG. 6A depicts an excerpt of a help file associated with the report of FIG. 5A.

FIG. 6B depicts an excerpt of a help file associated with the report of FIG. 5B.

DETAILED DESCRIPTION OF THE INVENTION

A description of example embodiments of the invention follows.

With the increased use of storage devices, customers are more frequently using snapshot technology in order to capture the state of the system, often to aid with troubleshooting failures/issues, or to save/backup the state of a virtual machine. Snapshots are taken of the system data, either using automated or manual approaches. Snapshots may include information such as system data, and control information relevant to the snapshot operation. Snapshots may be taken for hardware and software elements in a system, including but not limited to a host machine, a storage device, and a tunneling interface between the host machine and the storage device. Snapshot operations may include, but are not limited to, taking a snapshot, or reverting the system to the saved state from the snapshot.

Using an auto-snapshot manager (ASM) tool, a snapshot is taken, the snapshot being triggered either by the user, or by a scheduled backup procedure. Typically, the auto-snapshot manager tool performs a handshake between processes and then brings the system to a quiescent state prior to performing the snapshot.

Although snapshots are frequently performed in the industry, there is a need for a method that analyzes and troubleshoots snapshot-related information and is comprehensive in that it covers the host machine and the associated storage device that connected to the host machine through a tunnel or other means. The present invention solves this need by collecting and analyzing snapshot related information. The present invention performs an analysis that includes snapshot information related to the host machine, the storage device and/or volume, and the discovery connection between the host and storage device.

Figure 1:
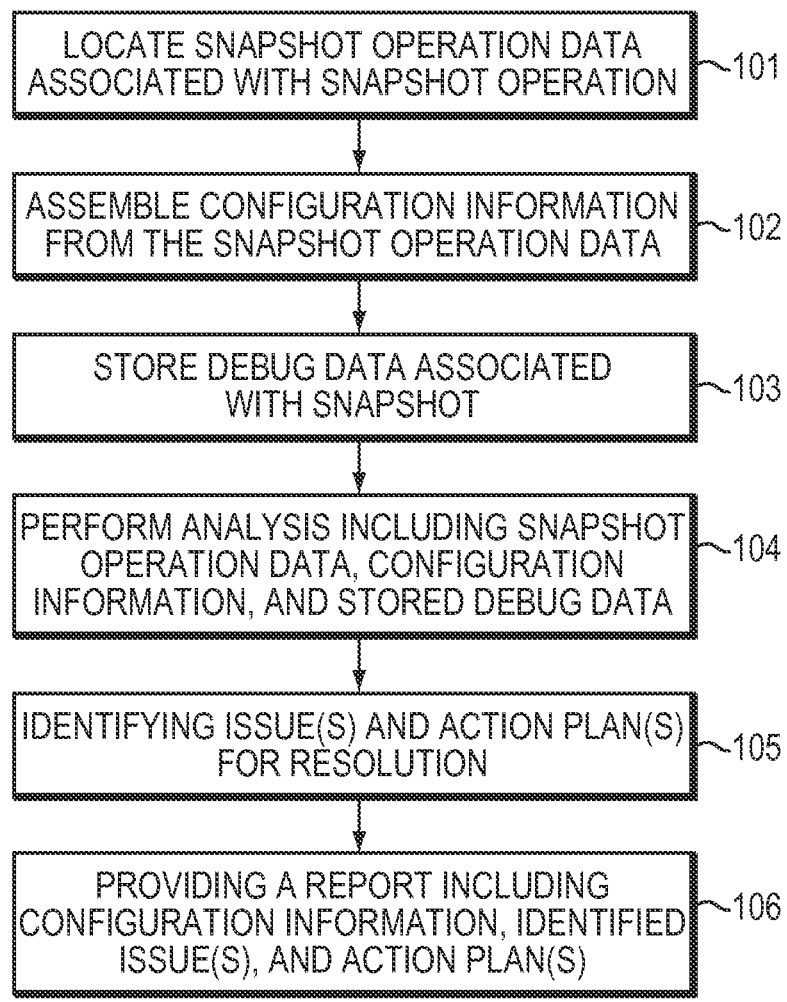
FIG. 1 is a flowchart of a method of analyzing snapshot operation data of one or more snapshot operations associated with at least one storage device and at least one host computer, according to an embodiment of the invention.

FIG. 1 is a flowchart of a method of analyzing snapshot operation data of one or more snapshot operations associated with at least one storage device and at least one host computer, according to an embodiment of the invention. The method 100 begins by locating the snapshot operation data 101. Next, configuration information is assembled from the snapshot operation data 102. Further, debug data associated with the one or more snapshot operations is stored 103. An analysis is performed 104 including the snapshot operation data, the configuration information, and the stored debug data. Next, the method identifies one or more issues and one or more action plans for resolution based upon the analysis 105. Finally, the method provides a report 106 to one or more users including the configuration information, the one or more identified issues, and the one or more action plans.

The method 100 begins by locating the snapshot operation data 101. With the increased use of storage devices and host machines, there is also an increased potential for failures in snapshot operations that affect the host machine, storage devices, or the interface between the host machine and storage device. An extensive diagnostic log file (including snapshot operation data) may be produced for a support engineer to review. In order to obtain diagnostic log files for the snapshot operation data and the debug data, an auto-snapshot manager tool may be employed.

For example, in one embodiment, services may be run on the server. One or more processes, services, or daemons may be included in this embodiment. In addition (or alternatively), the following six services may be included in this embodiment. The auto-snapshot manager tool may utilize one or more of the six application services, or other daemons, processes, or services (collectively "services") to aid in collection of the snapshot operation related data and debug data. These services are preferably reliant on the proper function of a Remote Procedure Call (RPC). The first service (or another other service and/or process), may be a VSS (Volume Snapshot Service) Requestor, may request volume smart copies using the WINDOWS Volume Snapshot Service (VSS). The second service (or another other service and/or process), may be a VSS, may provide smart copy capabilities for volumes (storage devices) to the WINDOWS VSS Service. The second service (or another other service and/or process), may act as a hardware provider service.

A third service (or another other service and/or process), an Auto-Snapshot Manager Agent, may allow for local and remote management of Auto-Snapshot Manager functionality. This third service may manage Auto-Snapshot Manager (ASM) processes. A fourth service (or another other service and/or process), a Host Connection Management Service, may work together with a device specific module (DSM) driver to support Multi-Path input/output (IO) on storage devices and/or volumes. A fifth service (or another other service and/or process), the Trace Logging Service, collects trace information from other services and applications for support purposes. A sixth service (or another other service and/or process), a Virtual Disk Service (VDS) Hardware Provider, creates volumes as requested by the WINDOWS VDS Service. This sixth service (or another other service and/or process) may work in conjunction with the WINDOWS Storage Manager graphical user interface (GUI) in Microsoft and disk manager. Note, like with any WINDOWS services one may use net stop/net start services on a Disk Operating System (DOS) prompt, using a control file, or other means, in order to control one of the six services.

One of the above mentioned six services, or an additional process, service, or daemon, may be used to locate the snapshot operation data. The snapshot operation data may be information in the form of log files, from one or more snapshot vendors (software vendors that provide snapshot technology). The present invention is currently implemented and is currently compatible with multiple snapshot vendors. The snapshot operation data may include one or more log files with one or more hardware, software, or configuration characteristics of the one or more snapshot operations.

In one embodiment, the snapshot operation data may include, but is not limited to, log file data, including but not limited to multipathing logs, remote installation logs, multipathing installation logs, debug tracing output for components, host installation toolkit (HIT) installation logs, application logs, system logs, logs collecting multipath input/output (MPIO) failures, logs collecting MSI installs (Medium-Scale Integration, Microsoft Installer), logs collecting service states, logs collecting virtual disk service or disk manager information, logs used for target mapping, logs for VSS, logs for VSS administration commands, cluster logs, logs for installation components, logs that capture registry changes for MPIO, logs that capture registry changes for VSS, logs that capture install of remote setup, logs for application programming interface (API) setup. Note, the MSI may be used by the HIT to deploy software remotely through means, such as active directory, to execute the setup files and MSI packages.

In addition, the snapshot operation data may include logs that capture driver, module, and system component information and kernel errors, logs that include information about installation events in the device installation text log, logs that include information about device and driver installations, logs that include information about application software installations associated with the device driver installations, logs including information for Plug and Play (PNP) device installation applications, class installers, and co-installers.

In another embodiment, the snapshot data may include but is not limited to, log file information of the following: data for debug tracing output of all components, boot-logs of the system, debug tracing output of components, bootlogs of the application/appliance/system (where an appliance may include, but is not limited to a computer appliance/device and/or software appliance/application), APACHE TOMCAT logging, console messages taken at a specific time, backup Structured Query Language (SQL) database logs/tables, Unix/Linux "df" output to check space consumption of the application/appliance/system, kernel message logs, logs capturing first deployment boot messages, logs capturing first deployment failure boot messages, memory and swap usage logs, memory and swap usage logs, Global Cache Service (GCS) logs, H2 (Hypersonic 2) Database Engine SQL information, Linux init services error log information, Linux "db" logs, routing data, services running, server logs, installation logs, simulation logs, security information manager events, API wrapper logs, storage management service logs (SMS), snapshot database, processes output, Virtual Appliance Management Infrastructure (VAMI) logs, plug-in data, software installation service, VAMI deployment template logs, VAMI plugin logs, VAMI command line interface (CLI), logs reported for the small-footprint common information model broker daemon ("sfcbd") service, boot logs, Unix/Linux "dmesg" logs, message logs, VMWARE VSTORAGE API (VASA) logs, version information, version of virtual studio of the application/appliance/system. Note, in one embodiment, H2 Database Engine SQL information may allow the VSM to communicate with VCENTER using a Common Information Model (CIM). In one embodiment, the CIM monitors hardware and health status. The CIM may include a standard set of APIs that remote applications may use to query the health and status of the VMWARE ESXI host.

As illustrated in FIG. 1, after snapshot data is obtained 101, the configuration information is assembled 102 from the snapshot operation data. The configuration information may include at least one hardware characteristic, software characteristic, environmental characteristic, configuration characteristic, or network characteristic. The configuration information may include, but is not limited to, at least one of the following: snapshot directory path, group name, host name, management internet protocol (IP) address, system/application/appliance version, VASA version, number of peer storage (PS) groups and/or storage devices/arrays, routing table data, server name information, server model information, operating system information, processor information, multipath input/output version, Host Integration Toolkit (HIT) update history. Configuration information 520 (collectively 520a, 520b, 520c, and 520d) is illustrated in FIG. 5A (example report 501), FIG. 5B (example report 502), FIG. 6A (example help report 503), and FIG. 6B (example help report 504), respectively.

Next, referring back to FIG. 1, debug data is obtained and stored 103. Debug data may be obtained and stored through the use of one or more of the six services described above, or through an another process, service and/or daemon. Debug data may include other system data that is not directly associated with the snapshot operation. The debug data may include, but is not limited to, information pertaining to a physical server, operating system build, initiator, driver, target, storage device, volume, scheduler, password and/or security information, brand name, processor, multipath, or update history.

In one embodiment, debug data may include information pertaining to VSS administration providers, writers, shadows, or shadow storage. Debug data may include information pertaining to Internet Small Computer System Interface (iSCSI) command line interface (CLI) targets, target portals, persistent targets, lists, target mappings, session lists, persistent devices. In another embodiment, debug data may include information pertaining to VMWARE support logs, VMWARE VSPHERE VCENTER server logs and/or support logs, simulation logs, short message service (SMS) logs, or JAVA software console logs.

Next, as illustrated in FIG. 1, an analysis is performed 104 including the collective data types: snapshot operation data, the configuration information, and the stored debug data. The analysis applies a set of one or more rules/checks to the log files and/or data structures within one or more of the collective data types to identify issues. The analysis may include searching for key words/numbers/characters or key data structures within the log files and/or collective data types. The rules/checks may include checks against a specified threshold, range, a specific criteria/value, or other types of checks. The analysis may apply a set of checks/rules to detect one or more issues with at least one of the following characteristics: a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

The analysis may analyze the characteristics mentioned above against expected specification values. In addition, the analysis may check against known bugs/problems and report if any of the obtained data (snapshot operation data or stored debug data) falls outside of expected ranges, indicating a potential known bug/problem. The specific rules/checks used by the analysis may include checking that the hardware or software characteristics are valid within a predefined range/threshold.

The analysis may perform a check to determine if an issue exists at least one of the following: VSS control volume inaccessibility, incorrect host credentials, cluster nodes not being added to a hit group, broken or inaccessible snapshots, persistent reserve (PR) reservations for volumes that are no longer found, install issues due to using MSI installer, faulty driver, faulty driver version, application errors, application hangs, application crashes, issues with creating or maintaining a Server Virtualization (using MICROSOFT WINDOWS, VMWARE, or other environments), issues when the virtual machine (VM) is using storage direct, missing internal public simple network management protocol (SNMP) string, failed cluster volume with no registrants, missing challenge-handshake authentication protocol (CHAP) username, VSS administration list shadow error, missing groups, conflicts on volumes being replicated while their datastore is also being replicated, replications issues while communicating with one or more peers, issues with group connectivity and credentials, virtualization product connectivity issues in which one or more servers are on a virtual machine while using replication or snapshots, deleted VMWARE Snapshot Manager (VSM) peer in which broken replicas remain, appliance being deployed but having no group detected at the time the diagnostics were run, errors accessing group from VSM, unsaved changes pending restart of appliance, and VASA registration failures.

The analysis may perform a set of checks, as illustrated in the help file reports in FIG. 6A (see element 521c indicating checks performed) and FIG. 6B (see element 521d indicating checks performed). The checks in the help files 503, 504 from FIG. 6A and FIG. 6B, respectively, may include, but are not limited to, any of the above mentioned checks that are performed.

Next, referring back to FIG. 1, the method 100 identifies one or more issues and one or more action plans for resolution based upon the analysis 105. The issues identified may include, but are not limited to, one or more issues with a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

The one or more issues may include, but is not limited, to an issue with at least one of the following: VSS control volume inaccessibility, incorrect host credentials, cluster nodes not being added to a hit group, broken or inaccessible snapshots, persistent reserve (PR) reservations for volumes that are no longer found, install issues due to using MSI installer, faulty driver, faulty driver version, application errors, application hangs, application crashes, issues with creating or maintaining a Server Virtualization (using WINDOWS, VMWARE, or other environments), issues when the virtual machine (VM) is using storage direct, missing internal public simple network management protocol (SNMP) string, failed cluster volume with no registrants, missing challenge-handshake authentication protocol (CHAP) username, VSS administration list shadow error, missing groups, conflicts on volumes being replicated while their datastore is also being replicated, replications issues while communicating with one or more peers, issues with group connectivity and credentials, virtualization product connectivity issues in which one or more servers are on a virtual machine while using replication or snapshots, deleted VMWARE Snapshot Manager (VSM) peer in which broken replicas remain, appliance being deployed but having no group detected at the time the diagnostics were run, errors accessing group from VSM, unsaved changes pending restart of appliance, and VASA registration failures.

The one or more action plans may include, but are not limited, to an action plan for resolution of at least one of the following: a hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

The one or more action plans may include, but are not limited, to an action plan for resolution of at least one of the following: VSS control volume inaccessibility, incorrect host credentials, cluster nodes not being added to a hit group, broken or inaccessible snapshots, persistent reserve (PR) reservations for volumes that are no longer found, install issues due to using MSI installer, faulty driver, faulty driver version, application errors, application hangs, application crashes, issues with creating or maintaining a Server Virtualization (using WINDOWS, VMWARE, or other environments), issues when the virtual machine (VM) is using storage direct, missing internal public simple network management protocol (SNMP) string, failed cluster volume with no registrants, missing challenge-handshake authentication protocol (CHAP) username, VSS administration list shadow error, missing groups, conflicts on volumes being replicated while their datastore is also being replicated, replications issues while communicating with one or more peers, issues with group connectivity and credentials, virtualization product connectivity issues in which one or more servers are on a virtual machine while using replication or snapshots, deleted VMWARE Snapshot Manager (VSM) peer in which broken replicas remain, appliance being deployed but having no group detected at the time the diagnostics were run, errors accessing group from VSM including actions such as adding a group to VSM or rebooting a VSM appliance, or checking network statistics (netstat) output to confirm route to the subnet, action plans including unsaved changes pending restart of appliance, and action plans including VASA registration failures.

Referring back to FIG. 1, the method 100 of the present invention provides a report 106 to one or more users including the configuration information, the one or more identified issues, and the one or more action plans. The sample reports 501, 502 from FIG. 5A, FIG. 5B, respectively, indicate configuration information 520a, 520b, respectively, and issues detected 521a, 521b, respectively, and action plans for resolution 522a, 522b, respectively. The report may be provided in a series of text files, each of which identifies a specific issue. One skilled in the art realizes that this report may also be provided through a graphical user interface, or other means. The report may indicate failure indicators and warning indicators for specific characteristics, and the report provides configuration information, a list of issues detected, and an action plan for resolving the issues that may be identified.

Figure 2:
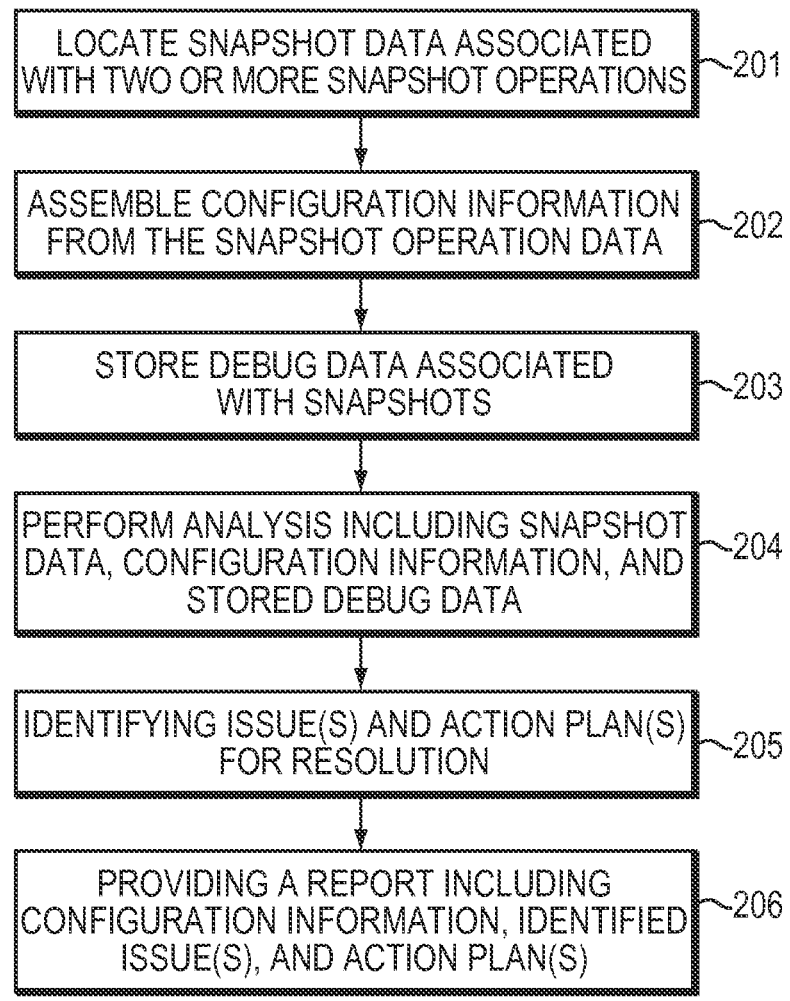
FIG. 2 is a flowchart of an embodiment of the method of FIG. 1 modified to use two or more snapshots.

As illustrated in FIG. 2, the method 100 may be extended 200 to handle two or more snapshot operations. FIG. 2 is a flowchart of a method of analyzing snapshot operation data of two or more snapshot operations associated with at least one storage device and at least one host computer, according to an embodiment of the invention. The method 200 begins by locating the snapshot operation data 201. Next, configuration information is assembled from the snapshot operation data 202. Further, debug data associated with the two or more snapshot operations is stored 203. An analysis is performed 204 including the snapshot operation data, the configuration information, and the stored debug data. Next, the method 200 identifies one or more issues and one or more action plans for resolution based upon the analysis 205. Finally, the method provides a report 206 to one or more users including the configuration information, the one or more identified issues, and the one or more action plans.

Figure 3A:
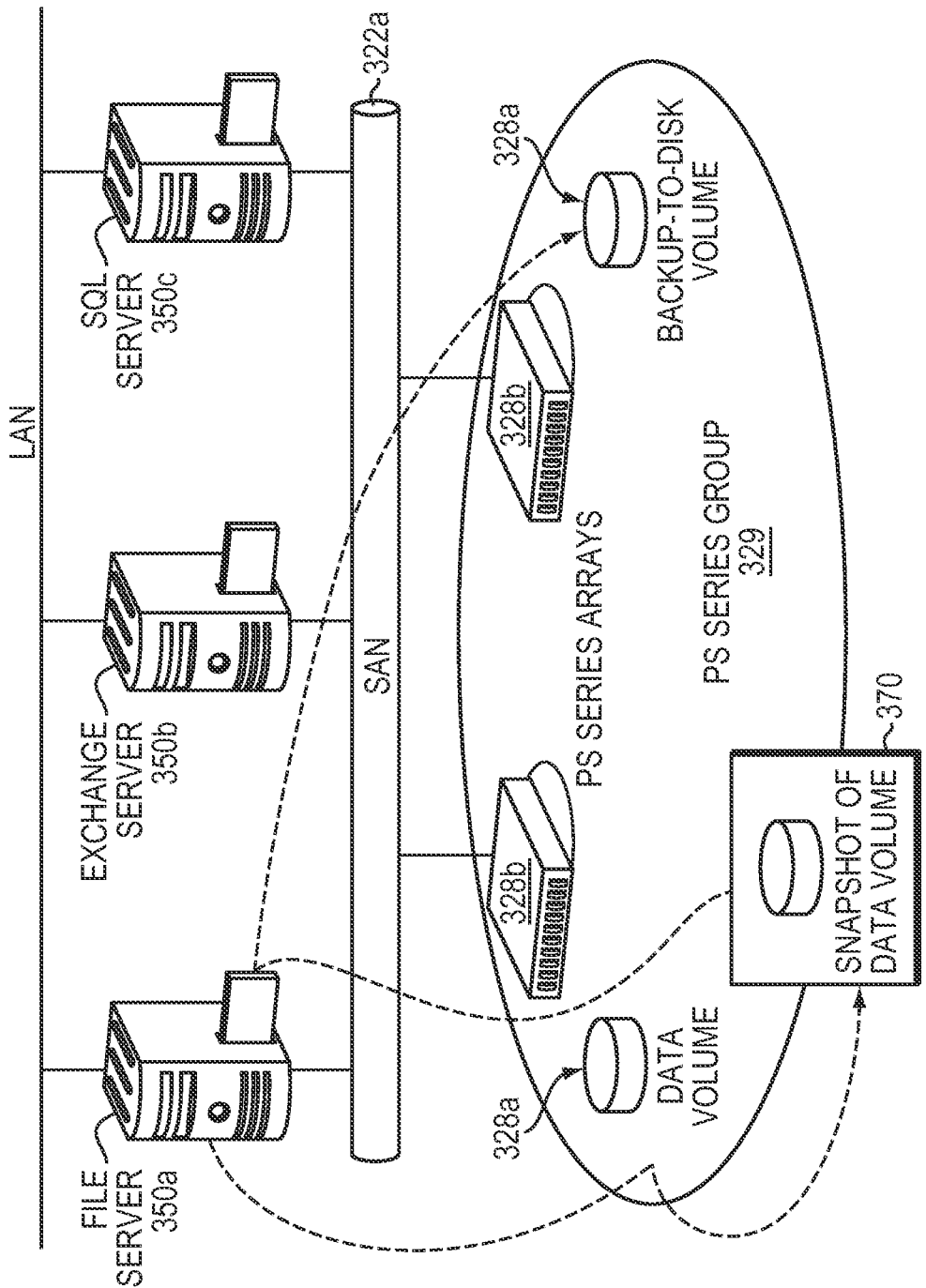
FIG. 3A depicts a simplified block diagram of an Information Handling System (IHS) configured to analyze snapshot operation data, according to an embodiment of the invention.

FIG. 3A depicts a simplified block diagram of an Information Handling System (IHS) configured to analyze snapshot operation data, according to an embodiment of the invention. As illustrated in FIG. 3A, a snapshot may be performed as follows. On a server 350 (collectively, 350a, 350b, and 350c), the VSS-application begins the backup process, which may be initiated manually or through a MICROSOFT WINDOWS scheduled task. The VSS-application notifies VSS and requests the data backup. The VSS notifies the New Technology File System (NTFS) to prepare for the backup (for example, quiesce and flush the buffer cache). The VSS notifies the Peer Storage (PS) Series group 329 via VSS control and a tunnel application, across the internet protocol storage area network (IP SAN) 322a, to create a shadow copy. The PS Series group may include, but is not limited, to, data volumes 328a, and PS series data arrays 328b. Next, the PS Series group creates the snapshot 370. Then, VSS notifies NTFS to resume normal operation.

Figure 3B:
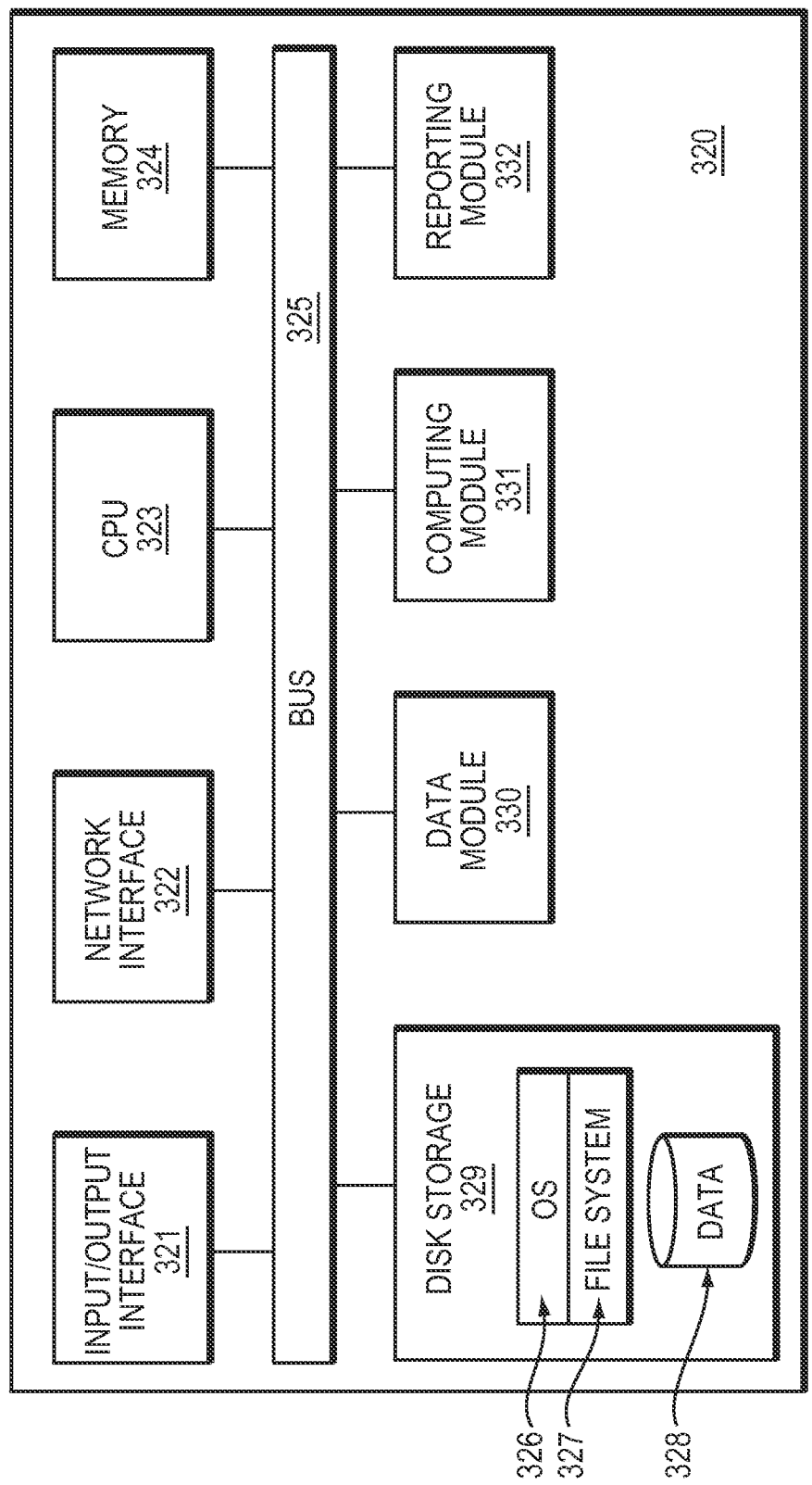
FIG. 3B is a simplified block diagram of another Information Handling System (IHS) configured to analyze snapshot operation data, according to an embodiment of the invention.

FIG. 3B is a simplified block diagram of an Information Handling System (IHS) of the present invention, configured to analyze snapshot operation data, according to an embodiment of the invention. The IHS 320 comprises a bus 325. The bus 325 is a connection between the various components of the IHS 320. Connected to the bus 325 is an input/output interface 321 for connecting various input and output devices, such as a keyboard, mouse, display, speakers, etc. to the IHS

320. Further connected to the bus 325 is a network interface 322 for connecting the IHS 320 to the various networks that are known in the art. A Central Processing Unit (CPU) 323 is connected to the bus 325 and provides for the execution of computer instructions. Memory 324 provides volatile storage for data used for carrying out computer instructions. Disk storage 329 provides non-volatile storage for software instructions such as the operating system (OS) 326 and the data 328. Coupled with the OS 326, is the file system 327. Disk storage 329 may be any storage device known in the art.

As illustrated in FIG. 3B, the IHS may include a data module 330 configured to locate the snapshot operation data associated with the one or more snapshot operations associated with the at least one storage device 329 and the at least one host computer. The IHS 320 and its various components and modules work in conjunction to analyze snapshot operation data of one or more snapshot operations associated with at least one storage device and at least one host computer. The host computer may be connected directly to the bus 325 or via a network interface 322 or input/output interface 321. The data module 330 may be further configured to assemble configuration information from the snapshot operation data. The data module 330 may be further configured to store debug data associated with the one or more snapshot operations. The data module 330 may retrieve the data from any communicatively coupled source. For example, the data module 330 may retrieve the data from the storage device 329 or via the input/output interface 321 or network interface 322.

The IHS may include a computing module 331 that may be configured to perform an analysis including the snapshot operation data, the configuration information, and the stored debug data. The computing module 331 may be further configured to identify one or more issues and one or more action plans for resolution based upon the analysis. The IHS may include a reporting module 332 (display module) configured to provide a report to one or more users including the configuration information, the one or more identified issues, and the one or more action plans. The reporting module 332 may display a report in a text-based format, via a graphical user interface (GUI), or through other means.

Figure 4:
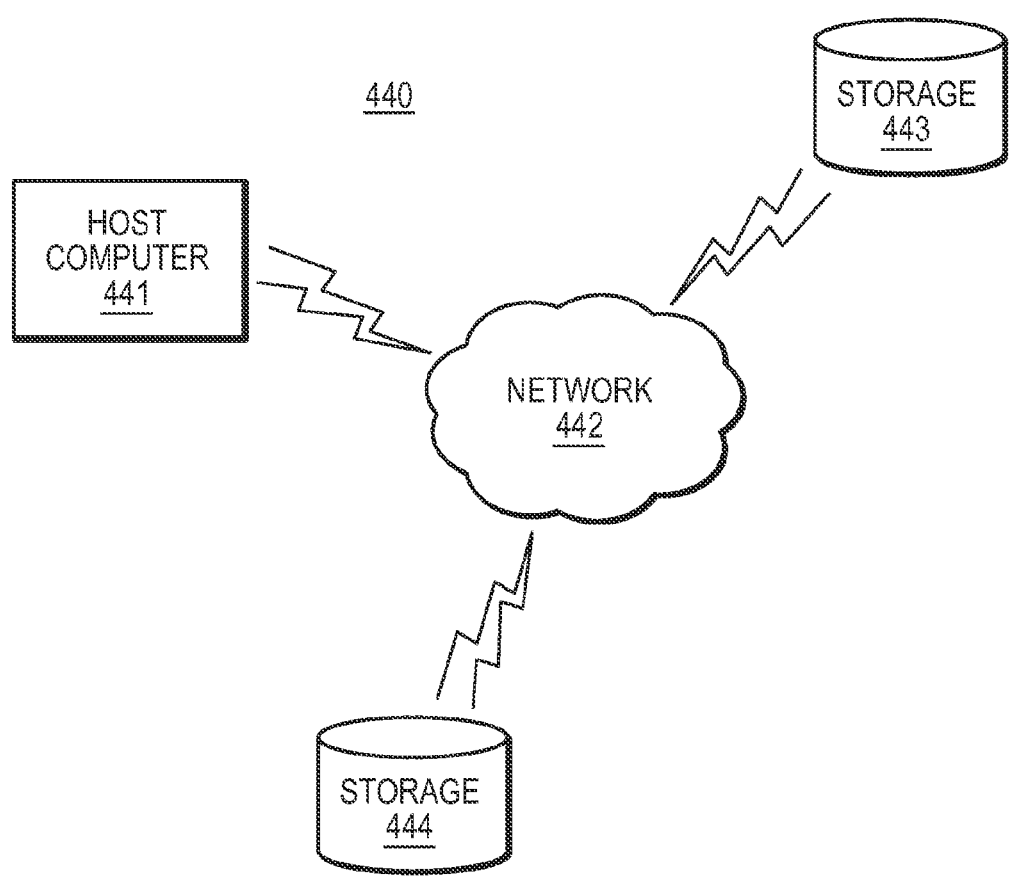
FIG. 4 depicts a computer network environment in which an embodiment of the present invention may be implemented.

FIG. 4 illustrates a computer network environment 440 in which the present invention may be implemented. The host computer 441 and the storage devices 443 and 444 are linked through network 442. The host computer 441 and the storage devices 443 and 444 may be connected through any network as is known in the art, including a wide area network (WAN) or local area network (LAN). The host computer 441 may embody the IHS 320 and/or any embodiment of the IHS described herein. Similarly, the computer 441 may be configured to carry out any method or embodiment thereof described herein. According to an embodiment of the present invention, the computer 441 is configured to analyze snapshot operation data of one or more snapshot operations associated with at least one storage device 443, 444 and at least one host computer 441. While only one host computer 441 and two storage devices are depicted, 443 and 444, the computer network environment 440 may comprise any number of storage devices or host computers.

FIG. 5A depicts one embodiment of a report 501 provided to a user. As described above, the report 501 may include configuration information 520*a*, an issue detected 521*a*, and an action plan for resolution 522*a*. FIG. 5B depicts another embodiment of a report 502 provided to a user. As described above, the report 502 may include configuration information 520*b*, issues detected 521*b*, and an action plan for resolution 522*b*.

FIG. 6A depicts an excerpt of a help file associated with the report of FIG. 5A. As illustrated in FIG. 6A, the help file report 503 may include configuration information 520*c* and a set of issues that are checked for 521*c*. FIG. 6B depicts an excerpt of a help file associated with the report of FIG. 5B. As illustrated in FIG. 6B, the help file report 504 may include configuration information 520*d* and a set of issues that are checked for 521*d*. As illustrated in FIG. 6A and FIG. 6B, issues may be identified by bug number or by Knowledge-Centered Support (KCS) reference number, or by other means.

It should be understood that the example embodiments described above may be implemented in many different ways. In some instances, the various methods and machines described herein may be implemented by a physical, virtual or hybrid general-purpose computer, or a computer network environment such as the computer network environment 440. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

An advantage of the present invention is that it directly relates to customer satisfaction as it dramatically reduces time to resolution and improves accuracy of diagnosis for snapshot issues. The present invention reduces technical support costs by aiding with troubleshooting problems with snapshots.

Another advantage of the present invention is that it helps to improve overall product quality by allowing support/engineering to proactively find and fix snapshot issues that may not have been reported by customers.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for analyzing snapshot operation data of one or more snapshot operations associated with at least one storage device and at least one host computer, the computer-implemented method comprising:
configuring to a quiescent state, the at least one host computer, the at least one storage device, and a tunneling interface positioned between the at least one host computer and the at least one storage device;
based upon the configured quiescent state, performing the one or more snapshot operations to retrieve the snapshot operation data from (i) the tunneling interface positioned between the host computer and the at least one storage device and (ii) zero or more of: the at least one host computer and the at least one storage device;
locating the snapshot operation data associated with the one or more performed snapshot operations;
assembling configuration information from the snapshot operation data;
storing debug data associated with the one or more performed snapshot operations;
performing an analysis including the snapshot operation data, the assembled configuration information, and the stored debug data;
identifying one or more issues and one or more action plans for resolution based upon the analysis; and
providing a report to one or more users including the assembled configuration information, the one or more identified issues, and the one or more identified action plans.

2. The computer-implemented method of claim 1 further comprising:
determining a vendor type of a vendor that provided the one or more performed snapshot operations, and performing the analysis including the snapshot operation data based upon the vendor type.

3. The computer-implemented method of claim 1 wherein the snapshot operation data includes one or more log files with one or more hardware, software, or configuration characteristics of the one or more performed snapshot operations.

4. The computer-implemented method of claim 1 wherein the one or more identified issues include one or more issues at the at least one host computer, one or more issues at the at least one storage device, or one or more issues at the tunneling interface between the host computer and the storage device.

5. The computer-implemented method of claim 1 wherein the one or more identified issues include one or more hardware, configuration, or software issues.

6. The computer-implemented method of claim 1 wherein the one or more identified issues include one or more potential issues.

7. The computer-implemented method of claim 1 wherein:
the configuration information includes at least one hardware characteristic, software characteristic, environmental characteristic, configuration characteristic, or network characteristic;
the one or more identified issues include an issue with at least one of: hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic; and
the one or more identified action plans include an action plan to correct or update at least one of: hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

8. The computer-implemented method of claim 1 further comprising analyzing the snapshot operation data from two or more performed snapshot operations, the computer-implemented method comprising:
locating the snapshot operation data associated with the two or more performed snapshot operations;
assembling configuration information from the snapshot operation data;
storing debug data associated with the two or more performed snapshot operations;
performing an analysis including the snapshot operation data, the assembled configuration information, and the stored debug data;
identifying one or more issues and one or more action plans for resolution based upon the analysis; and
providing a report to one or more users including the assembled configuration information, the one or more identified issues, and the one or more identified action plans.

9. The method of claim 1, wherein the one or more performed snapshot operations retrieve the snapshot operation data from: the at least one host computer, the at least one storage device, and the tunneling interface between the host computer and the at least one storage device.

10. The method of claim 1, wherein the snapshot operation data includes log file data comprising multipathing logs, and zero or more of remote installation logs, multipathing installation logs, debug tracing output for components, host installation toolkit (HIT) installation logs, application logs, system logs, logs collecting Multipath Input-Output (MPIO) failures, logs collecting Medium-Scale Integration (MSI) installs, logs collecting service states, logs collecting virtual disk service or disk manager information, logs used for target mapping, logs for Volume Snapshot Service (VSS), logs for VSS administration commands, cluster logs, logs for installation components, logs that capture registry changes for MPIO, logs that capture registry changes for VSS, logs that capture install of remote setup, and logs for application programming interface (API) setup.

11. The method of claim 1, wherein the stored debug data includes system data that is indirectly associated with the snapshot operation.

12. The method of claim 1, wherein the host computer is a virtual machine.

13. An Information Handling System (IHS) comprising:
a processor; and
a memory with non-transitory computer code instructions stored therein, the memory operatively coupled to said processor such that the computer code instructions configure the processor to implement:
a data module configured to configure to a quiescent state, at least one host computer, at least one storage device, and a tunneling interface positioned between the at least one host computer and the at least one storage device;
the data module being further configured to perform one or more snapshot operations to retrieve snapshot operation data from (i) the tunneling interface positioned between the host computer and the at least one storage device and (ii) zero or more of: the at least one host computer and the at least one storage device;

the data module configured to locate the snapshot operation data associated with the one or more performed snapshot operations;

the data module further configured to assemble configuration information from the snapshot operation data;

the data module further configured to store debug data associated with the one or more performed snapshot operations;

a computing module configured to perform an analysis including the snapshot operation data, the assembled configuration information, and the stored debug data;

the computing module further configured to identify one or more issues and one or more action plans for resolution based upon the analysis; and a reporting module configured to provide a report to one or more users including the assembled configuration information, the one or more identified issues, and the one or more identified action plans.

14. The IHS of claim 13 wherein the computing module is further configured to determine a vendor type of a vendor that provided the one or more performed snapshot operations, and the computing module is further configured to perform the analysis including the snapshot operation data based upon the vendor type.

15. The IHS of claim 13 wherein the snapshot operation data includes one or more log files with one or more hardware, software, or configuration characteristics of the one or more performed snapshot operations.

16. The IHS of claim 13 wherein the one or more identified issues include one or more issues at the at least one host computer, one or more issues at the at least one storage device, or one or more issues at the tunneling interface between the host computer and the storage device.

17. The IHS of claim 13 wherein the one or more identified issues include one or more hardware, configuration, or software issues.

18. The IHS of claim 13 wherein:

the configuration information includes at least one hardware characteristic, software characteristic, environmental characteristic, configuration characteristic, or network characteristic;

the one or more identified issues include an issue with at least one of: hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic; and the one or more identified action plans include an action plan to correct or update at least one of: hardware component, hardware module, hardware configuration, hardware interconnect, environmental condition, configuration condition, firmware, firmware version, software, software version, software configuration, memory, disk space, network connectivity, network configuration, multipath input/output (MPIO) configuration, or performance characteristic.

19. The IHS of claim 13 wherein the IHS analyzes the snapshot operation data from two or more performed snapshot operations, the IHS comprising:

a data module configured to locate the snapshot operation data associated with the two or more performed snapshot operations associated with the at least one storage device and the at least one host computer;

the data module further configured to assemble configuration information from the snapshot operation data;

the data module further configured to store debug data associated with the two or more performed snapshot operations;

a computing module configured to perform an analysis including the snapshot operation data, the assembled configuration information, and the stored debug data;

the computing module further configured to identify one or more issues and one or more action plans for resolution based upon the analysis; and a reporting module configured to provide a report to one or more users including the assembled configuration information, the one or more identified issues, and the one or more identified action plans.

20. A non-transitory computer readable medium having stored thereon a sequence of instructions which, when loaded and executed by a processor coupled to an apparatus, causes the apparatus to:

configure to a quiescent state, at least one host computer, at least one storage device, and a tunneling interface positioned between the at least one host computer and the at least one storage device;

perform one or more snapshot operations to retrieve snapshot operation data from (i) the tunneling interface positioned between the host computer and the at least one storage device and (ii) zero or more of: the at least one host computer and the at least one storage device;

locate snapshot operation data associated with one or more performed snapshot operations;

assemble configuration information from the snapshot operation data;

store debug data associated with the one or more performed snapshot operations;

perform an analysis including the snapshot operation data, the assembled configuration information, and the stored debug data;

identify one or more issues and one or more action plans for resolution based upon the analysis; and provide a report to one or more users including the assembled configuration information, the one or more identified issues, and the one or more identified action plans.

* * * * *